United States Patent
Hughes et al.

(10) Patent No.: US 7,348,875 B2
(45) Date of Patent: Mar. 25, 2008

(54) SEMI-PASSIVE RADIO FREQUENCY IDENTIFICATION (RFID) TAG WITH ACTIVE BEACON

(75) Inventors: Michael A. Hughes, Pasco, WA (US); Richard M. Pratt, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 421 days.

(21) Appl. No.: 10/839,058

(22) Filed: May 4, 2004

(65) Prior Publication Data

US 2005/0248438 A1   Nov. 10, 2005

(51) Int. Cl.
*H04Q 5/22* (2006.01)
*G08B 13/14* (2006.01)

(52) U.S. Cl. .................. 340/10.4; 340/10.1; 340/10.3; 340/572.1; 340/572.2

(58) Field of Classification Search ............... 340/10.4, 340/10.1, 10.3, 572.4, 572.2, 572.1
See application file for complete search history.

(56) References Cited

U.S. PATENT DOCUMENTS

| | | | |
|---|---|---|---|
| 5,097,253 A | 3/1992 | Eschbach et al. ............ 340/525 |
| 5,541,604 A | 7/1996 | Meier ........................... 342/42 |
| 5,745,049 A | 4/1998 | Akiyama et al. ...... 340/870.17 |
| 5,854,994 A | 12/1998 | Canada et al. ................ 702/56 |
| 5,907,491 A | 5/1999 | Canada et al. ......... 364/468.15 |
| 6,023,610 A | 2/2000 | Wood, Jr. .................... 455/101 |
| 6,025,783 A * | 2/2000 | Steffens, Jr. ................ 340/644 |
| 6,084,522 A | 7/2000 | Addy ........................... 340/630 |
| 6,486,780 B1 | 11/2002 | Garber et al. ............ 340/572.1 |
| 6,525,648 B1 | 2/2003 | Kubler et al. ............. 340/10.33 |
| 6,557,238 B1 | 5/2003 | Becherucci et al. .......... 29/596 |
| 6,566,997 B1 | 5/2003 | Bradin ........................ 340/10.2 |
| 6,738,025 B2 | 5/2004 | Carrender ................... 343/860 |
| 6,745,008 B1 | 6/2004 | Carrender et al. ......... 455/41.1 |
| 6,765,476 B2 | 7/2004 | Steele et al. ................ 340/10.4 |
| 6,806,808 B1 | 10/2004 | Watters et al. ........... 340/10.41 |
| 6,842,106 B2 | 1/2005 | Hughes et al. ............... 340/5.8 |
| 6,861,950 B2 | 3/2005 | Katou ........................ 340/447 |
| 6,868,073 B1 | 3/2005 | Carrender ................... 370/278 |
| 6,870,461 B2 * | 3/2005 | Fischer et al. ............. 340/10.1 |
| 6,919,807 B2 * | 7/2005 | Shek et al. .............. 340/572.1 |
| 6,934,540 B2 * | 8/2005 | Twitchell, Jr. ........... 455/422.1 |

(Continued)

FOREIGN PATENT DOCUMENTS

DE      102 05 936 A1    8/2003

(Continued)

OTHER PUBLICATIONS

PCT International Search Report and Written Opinion, PCT/US2005/044644, Mar. 24, 2006 (10 pp.).

*Primary Examiner*—Jeffery Hofsass
*Assistant Examiner*—Scott Au
(74) *Attorney, Agent, or Firm*—Wells St. John (57) ABSTRACT

A radio frequency beacon device for use with a backscatter interrogator includes a processor; a receiver coupled to the processor; a backscatter modulator coupled to the processor; and an active transmitter coupled to the processor, the active transmitter being configured to transmit an RF signal, in response to a trigger signal, regardless of whether the interrogator is providing a carrier wave for backscatter modulation by the backscatter modulator. Other methods and apparatus are provided.

72 Claims, 2 Drawing Sheets

U.S. PATENT DOCUMENTS

| | | |
|---|---|---|
| 6,937,144 B2 | 8/2005 | Drake et al. ................. 340/447 |
| 7,030,761 B2 * | 4/2006 | Bridgelall et al. ........ 340/572.2 |
| 7,042,357 B2 * | 5/2006 | Girvin et al. ............ 340/568.2 |
| 2002/0149468 A1 | 10/2002 | Carrender et al. ......... 340/5.61 |
| 2002/0149484 A1 | 10/2002 | Carrender ................ 340/572.4 |
| 2003/0102961 A1 | 6/2003 | Fischer et al. ............. 340/10.1 |
| 2003/0104848 A1 | 6/2003 | Brideglall ................... 455/574 |
| 2004/0066279 A1 | 4/2004 | Hughes et al. ............. 340/10.1 |
| 2004/0066280 A1 | 4/2004 | Pratt et al. ................ 340/10.2 |
| 2004/0066281 A1 | 4/2004 | Hughes et al. ............. 340/10.2 |
| 2004/0066752 A1 | 4/2004 | Hughes et al. .............. 370/252 |
| 2004/0067764 A1 | 4/2004 | Pratt et al. ................... 455/502 |
| 2004/0070500 A1 | 4/2004 | Pratt et al. ................ 340/572.1 |
| 2004/0113790 A1 | 6/2004 | Hamel et al. ............. 340/572.1 |
| 2004/0198222 A1 | 10/2004 | Ertin et al. ................. 455/41.1 |
| 2004/0198233 A1 | 10/2004 | Pratt et al. ................ 455/67.11 |
| 2006/0139168 A1 | 6/2006 | Pratt et al. ............. 340/539.22 |

FOREIGN PATENT DOCUMENTS

| | | |
|---|---|---|
| DE | 10205936 A1 | 8/2003 |
| EP | 1 326 202 A2 | 7/2003 |
| EP | 1326202 A2 | 7/2003 |

* cited by examiner

FIG. 3

SEMI-PASSIVE RADIO FREQUENCY IDENTIFICATION (RFID) TAG WITH ACTIVE BEACON

TECHNICAL FIELD

The invention relates to radio frequency communications devices and methods. Other aspects of the invention relate to radio frequency identification devices.

BACKGROUND OF THE INVENTION

Remote communication utilizing wireless equipment typically relies on radio frequency (RF) technology, which is employed in many industries. One application of RF technology is in locating, identifying, and tracking objects, such as animals, inventory, and vehicles.

RF identification (RFID) tag systems have been developed to identify, monitor, or control remote objects.

An advantage of RFID systems is the non-contact, non-line-of-sight capability of the technology. Tags can be read through a variety of substances such as snow, fog, ice, paint, dirt, and other visually and environmentally challenging conditions where bar codes or other optically-read technologies would be useless. RF tags can also be read at remarkable speeds, in most cases responding in less than 100 ms (responding in significantly less than 100 ms in most cases).

There are three main categories of RFID tag systems. These are systems that employ beam-powered passive tags, battery-powered semi-passive tags, and active tags. Each operates in fundamentally different ways. The invention described below is particularly relevant to semi-passive tags, though other embodiments are possible.

The beam-powered RFID tag is often referred to as a passive device because it derives the energy needed for its operation from the radio frequency energy beamed at it. The tag rectifies the field and changes the reflective characteristics of the tag itself, creating a change in reflectivity (RF cross-section) that is seen at the interrogator. A battery-powered semi-passive RFID tag operates in a similar fashion, modulating its RF cross-section in order to change its reflectivity that is seen at the interrogator to develop a communication link. Here, the battery is the only source of the tag's operational power. Finally, in the active RFID tag, both the tag and reader have transceivers to communicate and are powered by respective batteries.

A typical RF tag system will contain at least one tag and one interrogator. The range of communication for such tags varies according to the transmission power of the interrogator, interrogator receiver sensitivity and selectivity, and backscatter characteristics of the tag. Battery-powered tags operating at 2,450 MHz have traditionally been limited to less than ten meters in range. However, devices with sufficient power can reach in excess of 100 meters in range, depending on the frequency and environmental characteristics.

Conventional continuous wave backscatter RF tag systems utilizing passive (no battery) RF tags require adequate power from a signal from the interrogator to power the internal circuitry in the tag used to modulate the signal back to the interrogator. While this is successful for tags that are located in close proximity to an interrogator, for example less than three meters, this may be insufficient range for some applications, for example greater than 100 meters.

SUMMARY OF THE INVENTION

Aspects of the invention provide a radio frequency beacon device for use with a backscatter interrogator, comprising a processor; a receiver coupled to the processor; a backscatter modulator coupled to the processor; and an active transmitter coupled to the processor, the active transmitter being configured to transmit an RF signal, in response to a trigger signal, regardless of whether the interrogator is providing a carrier wave for backscatter modulation by the backscatter modulator.

Other aspects provide a radio frequency beacon device for use with a backscatter interrogator, comprising a processor; a receiver coupled to the processor; a backscatter modulator coupled to the processor; an active transmitter coupled to the processor, the active transmitter being configured to transmit an RF signal to the interrogator, in response to a trigger signal, regardless of whether the interrogator is providing a carrier wave for backscatter modulation by the backscatter modulator; and a sensor coupled to the processor, the trigger signal being generated in response to a condition sensed by the sensor.

Other aspects provide a radio frequency communications device, for use with a backscatter interrogator, comprising a battery; a semi-passive radio frequency device, coupled to the battery, for use with a backscatter interrogator, including components configured to be supplied with power from the battery, wherein range is greater than for a passive backscatter radio frequency device, the semi-passive radio frequency device including: a processor; a receiver coupled to the processor; and a backscatter modulator coupled to the processor; and an active transmitter coupled to the processor and to the battery, the active transmitter being configured to transmit, in response to a trigger signal, regardless of whether the interrogator is providing a carrier wave for backscatter modulation by the backscatter modulator.

Still other aspects provide a method of manufacturing a radio frequency beacon device for use with a backscatter interrogator, the method comprising coupling a receiver to a processor, coupling a backscatter modulator coupled to the processor, and coupling an active transmitter to the processor; and arranging the active transmitter to transmit an RF signal, in response to a trigger signal, regardless of whether the interrogator is providing a carrier wave for backscatter modulation by the backscatter modulator.

Yet other aspects provide a method of manufacturing a radio frequency beacon device for use with a backscatter interrogator, the method comprising coupling a receiver to a processor, coupling a backscatter modulator coupled to the processor, and coupling an active transmitter to the processor; arranging the active transmitter to transmit an RF signal, in response to a trigger signal, regardless of whether the interrogator is providing a carrier wave for backscatter modulation by the backscatter modulator; and coupling a sensor to the processor, the trigger signal being generated in response to a condition sensed by the sensor.

Other aspects provide a method of manufacturing a radio frequency communications device, for use with a backscatter interrogator, the method comprising providing a battery; coupling a semi-passive radio frequency device to the battery, the device being for use with a backscatter interrogator and including components configured to be supplied with power from the battery, wherein range is greater than for a passive backscatter radio frequency device, the semi-passive radio frequency device including: a processor; a receiver coupled to the processor; and a backscatter modulator coupled to the processor; and coupling an active transmitter to the processor of the semi-passive tag and to the battery, and configuring the active transmitter to transmit, in response to a trigger signal, regardless of whether the interrogator is providing a carrier wave for backscatter modulation by the backscatter modulator; and coupling a sensor to the processor of the semi-passive tag, the trigger signal being generated in response to a condition sensed by the sensor.

BRIEF DESCRIPTION OF THE DRAWINGS

Preferred embodiments of the invention are described below with reference to the following accompanying drawings.

FIG. 3 is a detailed schematic diagram of components depicted in FIG. 1 or 2, according to one exemplary configuration.

DETAILED DESCRIPTION OF THE PREFERRED EMBODIMENTS

Attention is directed to the following commonly assigned applications, which are incorporated herein by reference:

U.S. patent application Ser. No. 10/263,826, filed Oct. 2, 2002, entitled "Radio Frequency Identification Device Communications Systems, Wireless Communication Devices, Backscatter Communication Methods and Radio Frequency Identification Device Communication Methods," by inventors Mike A. Hughes and Richard M. Pratt; U.S. patent application Ser. No. 10/263,809, filed Oct. 2, 2002, entitled "Method of Simultaneously Reading Multiple Radio Frequency Tags, RF Tag, and RF Reader," by inventors Emre Ertin, Richard M. Pratt, Mike A. Hughes, Kevin L. Priddy, and Wayne M. Lechelt; U.S. patent application Ser. No. 10/263,873, filed Oct. 2, 2002, entitled "RFID System and Method Including Tag ID Compression," by inventors Richard M. Pratt and Mike A. Hughes; U.S. patent application Ser. No. 10/264,078, filed Oct. 2, 2002, entitled "System and Method to Identify Multiple RF Tags," by inventors Mike A. Hughes and Richard M. Pratt; U.S. patent application Ser. No. 10/263,940, filed Oct. 2, 2002, entitled "Radio Frequency Identification Devices, Backscatter Communication Device Wake-Up Methods, Communication Device Wake-Up Methods and A Radio Frequency Identification Device Wake-up Method", by inventors Richard M. Pratt and Michael A. Hughes; U.S. patent application Ser. No. 10/263, 997, filed Oct. 2, 2002, entitled "Wireless Communication Systems, Radio Frequency Identification Devices, Methods of Enhancing a Communications Range of a Radio Identification Frequency Device, and Wireless Communication Methods," by inventors Richard Pratt and Steven B. Thompson; U.S. patent application Ser. No. 10/263,670 filed Oct. 2, 2002, entitled "Wireless Communications Devices, Methods of Processing a Wireless Communication Signal, Wireless Communication Synchronization Methods and a Radio Frequency Identification Device Communication Method," by inventors Richard M. Pratt and Steven B. Thompson; U.S. patent application Ser. No. 10/263,656, filed Oct. 2, 2002, entitled "Wireless Communications Systems, Radio Frequency Identification Devices, Wireless Communications Methods, and Radio Frequency Identification Device Communications Methods," by inventors Richard Pratt and Steven B. Thompson; U.S. patent application Ser. No. 10/263,635, filed Oct. 2, 2002, entitled "A Challenged-Based Tag Authentication Model," by inventors Mike A. Hughes and Richard M. Pratt; U.S. patent application Ser. No. 09/589,001, filed Jun. 6, 2000, entitled "Remote Communication System and Method," by inventors R. W. Gilbert, G. A. Anderson, K. D. Steele, and C. L. Carrender; U.S. patent application Ser. No. 09/802,408; filed Mar. 9, 2001, entitled "Multi-Level RF Identification System," by inventors R. W. Gilbert, G. A. Anderson, and K. D. Steele; U.S. patent application Ser. No. 09/833,465, filed Apr. 11, 2001, entitled "System and Method for Controlling Remote Device," by inventors C. L. Carrender, R. W. Gilbert, J. W. Scott, and D. Clark; U.S. patent application Ser. No. 09/588, 997, filed Jun. 6, 2000, entitled "Phase Modulation in RF Tag," by inventors R. W. Gilbert and C. L. Carrender; U.S. patent application Ser. No. 09/589,000, filed Jun. 6, 2000, entitled "Multi-Frequency Communication System and Method," by inventors R. W. Gilbert and C. L. Carrender; U.S. patent application Ser. No. 09/588,998; filed Jun. 6, 2000, entitled "Distance/Ranging by Determination of RF Phase Delta," by inventor C. L. Carrender; U.S. patent application Ser. No. 09/797,539, filed Feb. 28, 2001, entitled "Antenna Matching Circuit," by inventor C. L. Carrender; U.S. patent application Ser. No. 09/833,391, filed Apr. 11, 2001, entitled "Frequency Hopping RFID Reader," by inventor C. L. Carrender.

Further, an electronic security device is disclosed in commonly assigned U.S. Pat. No. 5,097,253 to Eschbach et al., incorporated herein by reference.

Figure 1:
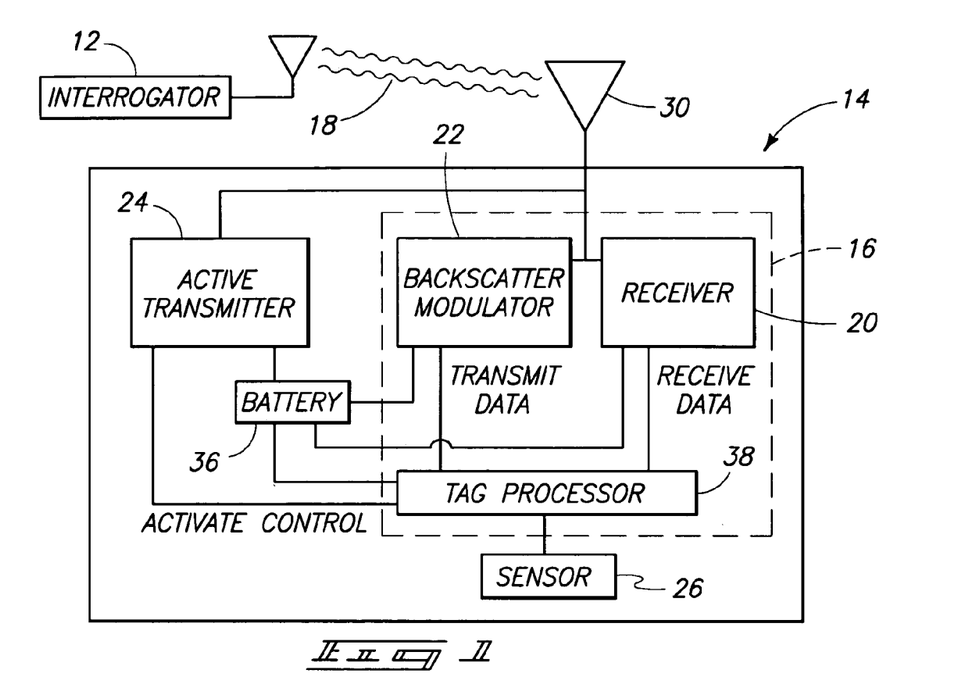
FIG. 1 is a schematic diagram of an RF beacon device in accordance with various embodiments of the invention.

FIG. 1 shows a radio frequency beacon device or tag device 14 for use with a backscatter interrogator 12. The device 14 includes a semi-passive RFID tag device 16 including components configured to receive power from a battery 36, not just from magnetic coupling, so that range is greater than for a passive tag. More particularly, in the illustrated embodiment, the semi-passive RFID tag device 16 includes a processor 38, a receiver electrically coupled to the processor (e.g., a low power receiver) 20, and a backscatter modulator or transmitter 22 electrically coupled to the processor 38.

The device further includes an active transmitter or beacon transmitter 24 coupled to the processor 38 of the semi-passive tag device 16. The active transmitter 24 is configured to transmit an RF signal, in response to a trigger signal, regardless of whether the interrogator 12 is providing a carrier wave for backscatter modulation by the backscatter modulator 22. This is referred to herein as asynchronous communications or transmissions.

In the embodiment shown in FIG. 1, the device 14 includes a common antenna 30 coupled to or shared by the backscatter modulator 22 and to the active transmitter 24.

The device 14 further includes a power source 36 coupled to the processor 38, backscatter modulator 22, receiver 20 and active transmitter 24. Power is supplied temporarily to the transmitter 24, from the power source, in response to the trigger signal (e.g., when needed). More particularly, in the illustrated embodiment, the power source is a battery 36 electrically coupled to the processor 38, receiver 20, and backscatter modulator 22. In other embodiments, the device includes a battery holder (not shown) electrically coupled to the processor 38, receiver 20, and backscatter modulator 22, and power is supplied only when a battery is later inserted into the battery holder.

In some embodiments, the transmitter 24 of the device merely provides an RF attention signal and the interrogator 12 thereafter contacts the device via backscatter communications. In other embodiments, the transmitter 24 transmits complete messages or codes via RF.

In the illustrated embodiment, the device further includes a sensor 26 coupled to the processor. The trigger signal is generated in response to a condition sensed by the sensor 26.

In some embodiments, the sensor 26 comprises a make-break sensor. In other embodiments, the sensor 26 comprises a tamper detection sensor. In yet other embodiments, the sensor 26 comprises a temperature sensor. In yet other embodiments, the sensor 26 comprises a moisture sensor. In still other embodiments, the sensor 26 comprises a shock sensor. In other embodiments, the sensor 26 comprises a temperature threshold sensor (e.g., that trips if sensed temperature is above a predetermined high temperature, or low temperature, or outside an acceptable range). In other embodiments, the sensor 26 comprises a vibration sensor (e.g., that senses mechanical vibration or senses if vibration exceeds a threshold level of vibration). In other embodiments, the sensor 26 comprises an acceleration sensor (e.g., that senses acceleration or senses if acceleration exceeds a threshold level of acceleration, like shock). In other embodiments, the sensor 26 comprises a humidity sensor (e.g., that senses humidity level, or senses if humidity exceeds a threshold level of humidity). In other embodiments, the sensor 26 comprises a tilt sensor (e.g., that senses tilt angle, or if an object is tilted or moved). In some embodiments, the sensor 26 comprises an electric field sensor (e.g., that senses an electric field being applied). In other embodiments, the sensor 26 comprises a magnetic field sensor (that senses a magnetic field being applied). In other embodiments, the sensor 26 comprises a gas concentration sensor (e.g., that senses the concentration of a gas, such as carbon monoxide, flammable gas, etc.). In other embodiments, the sensor 26 comprises a proximity sensor (e.g., that senses an object in proximity of the sensor). In other embodiments, the sensor 26 comprises an illumination sensor (e.g., that senses the level of light, or senses if the light level exceeds a threshold level of light). In other embodiments, the sensor 26 comprises a fluid level sensor (e.g., that senses a level of fluid, or senses if outside of a threshold level of fluid). In other embodiments, the sensor 26 comprises an immersion sensor (e.g., that senses when immersed in liquid). Other types of sensors could be employed. In some embodiments, multiple sensors are employed simultaneously.

The RF transmitter 24 is included to provide the ability to asynchronously signal the interrogator 12 when a specific condition has occurred. This can be done while keeping the smaller, lighter, less expensive semi-passive tag 16 advantages. In the illustrated embodiment, the transmitter 24 is activated with a very low duty cycle. More particularly, in the illustrated embodiment, the active transmitter 24 is left unpowered until needed.

Figure 2:
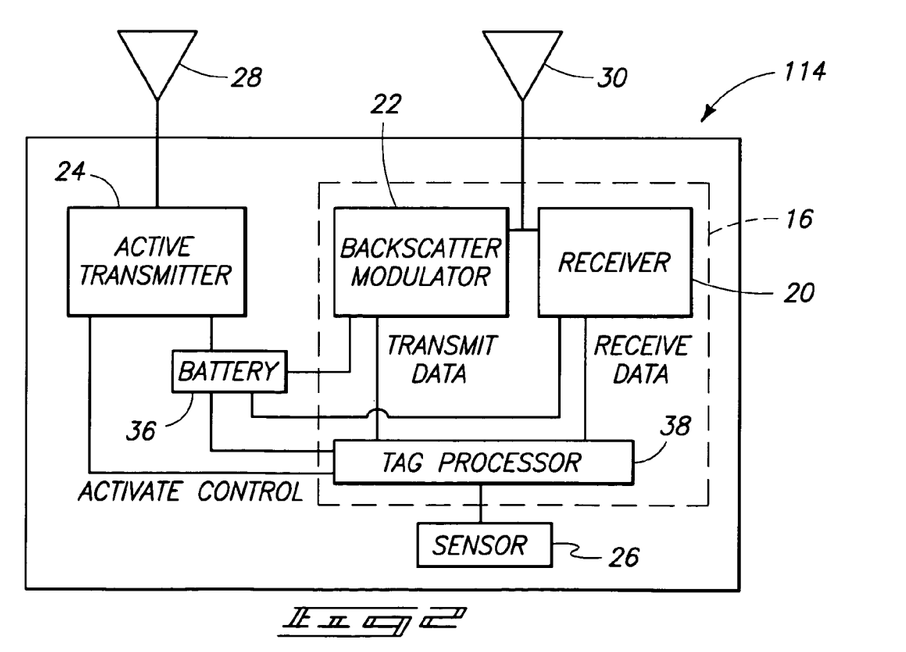
FIG. 2 is a schematic diagram of an RF beacon device in accordance with alternative embodiments.

FIG. 2 shows an alternative embodiment. In the embodiment of FIG. 2, the device 114 includes a separate antenna 28, and the transmitter 24 is connected to the separate antenna 28. This configuration offers the ability to use a different antenna configuration for the transmitter 28, allowing different antenna beam patterns and/or different frequencies. The differing beam patterns mean that an omni-directional antenna could be used for the transmitter 28 while a higher gain directional patch antenna 30 is used for the semi-passive backscatter communication. If the embodiment of FIG. 1 is used, appropriate isolation is provided so that the active transmitter 24 does not damage the semi-passive RFID device 16 during transmissions.

The signal transmitted by the transmitter 24 of either FIG. 1 or FIG. 2 can vary depending upon the application. In some embodiments, the transmitter signal contains a complete coherent message. In alternative embodiments, the transmitter 24 provides a signal that simply acts as an attention signal with the reader or interrogator contacting the device via backscatter for any communication. More particularly, in some embodiments, the interrogator 12 includes a receiver (not shown) configured to receive and interpret a signal from the transmitter 24; in alternative embodiments, a separate receiver (not shown) is provided to receive and interpret a signal from the transmitter 24 and that separate receiver is coupled to the interrogator 12.

The asynchronous communication capability provided by the transmitter 24 could be triggered by almost anything, including any desired sensor or timed events such as:
a) A make/break sensor 26 (e.g., a continuity sensor) has been triggered (e.g., a sensor-monitored drawer has been opened or sensor-monitored box has been moved);
b) A tamper detection sensor 26 has been triggered (e.g., someone is trying to remove the device from a box);
c) A temperature threshold has been reached (e.g., the device is too hot);
d) A shock event has occurred (e.g., the device has been dropped or mechanical shock has occurred);
e) The device is outside of the interrogator 12's signal range (the device has not seen reader communication in a predetermined time interval);
f) A vibration threshold has been reached;
g) An acceleration threshold has been reached;
h) A humidity threshold has been reached;
i) A tilt event has occurred;
j) An electric field threshold has been reached;
k) A magnetic field threshold has been reached;
l) A gas concentration threshold has been reached;
m) A proximity event has occurred (e.g., the device is in proximity with an object);
n) An illumination threshold has been reached;
o) A fluid level threshold has been reached; and/or
p) An immersion event has occurred.

Referring to FIG. 3, exemplary circuitry implementing the tag processor 38 and backscatter modulator 22 and receiver blocks 20 of FIG. 1 or 2 is provided in detail, to better enable one of ordinary skill to make and use the invention without undue experimentation. Alternative circuit implementations could also be employed. The depicted circuitry of FIG. 3 illustrates exemplary configurations of antenna 30, communications circuitry 32, wake-up circuitry 34, and processor 38. An exemplary processor 38 is a model number MSP430F1121 available from Texas Instruments, Inc. Other processor configurations are possible.

Battery 36 (not shown in FIG. 3) may be coupled with the illustrated VCC terminals and AGND terminals. The depicted exemplary circuitry of FIG. 3 is provided to illustrate possible methodologies and structures which may be utilized to implement aspects of the present invention. Other alternative arrangements and methods are possible.

At moments in time wherein device 14 is not actively receiving wireless signals or outputting wireless signals, device 14 and processor 38 may be provided in a first (i.e., sleep) mode of operation to reduce the consumption of electrical energy (e.g., from the battery). During the described first mode, processor 38 is provided in a reduced power consumption state wherein portions of internal circuitry of processor 38 may be deactivated to minimize energy consumption.

Circuitry of device 14 is arranged to detect the presence of radio frequency energy in the at least one configuration.

For example, the depicted device 14 includes a comparator 40 coupled with antenna 30 and arranged to receive electrical energy from antenna 30 corresponding to radio frequency energy received using antenna 30. As shown in the illustrated embodiment, antenna 30 is coupled with a plurality of diodes which operate to rectify electrical energy corresponding to the received radio frequency energy. The electrical energy received within comparator 40 from antenna 30 corresponds to a modulation signal of device 12.

Comparator 40 is configured to compare received radio frequency energy in the form of demodulated electrical energy with a reference. The reference may be selected to reject numerous types of spurious signals and to indicate reception of radio frequency energy which more closely resembles radio frequency energy outputted from device 12. Responsive to sufficient electrical energy being received within comparator 40 (e.g., a transition occurring in electrical energy from the antenna 30), the signal (FM0_IN) changes state which is received by processor 38.

Device 14 and processor 38 are arranged to enter another operational mode (e.g., second operational mode) and consume an additional amount of electrical energy compared with the consumption during the first mode operation responsive to the change of state of the FM0_IN signal. During such second operational mode, processor 38 is arranged to output a reference signal responsive to the detection of received radio frequency energy as indicated by comparator 40. In one arrangement, processor 38 is arranged to provide the reference signal comprising a clock signal. In the exemplary configuration of FIG. 3, an exemplary reference signal comprising a clock signal is indicated as ACLK. In one arrangement, the reference signal has a frequency corresponding (e.g., substantially equal) to a frequency of modulation of wireless signals 18. An exemplary frequency of the clock signal is 4 kHz; however, many other frequencies are usable.

In addition, processor 38 is arranged to assert a signal WAKE-UP_EN responsive to the radio frequency energy received via antenna 30 as indicated by comparator 40. Assertion of the WAKE-UP_EN signal, provides operational electrical energy to additional circuitry of device 14 including, for example, wake-up circuitry 34. According to additional aspects, processor 38 enables pin 9 to accept an interrupt and/or enables an internal watchdog timer during the second operational mode. As described further below, processor 38 is arranged to monitor for the reception of an indication signal via pin 9. The processor 38 may operate in a lowest power state that sustains enabled operations during the second operational mode.

As described above in the exemplary embodiment, upon reception of an appropriate signal using pin 10 of processor 38, communication circuitry 32 is configured to provide device 14 in the second operational mode responsive to a sufficient transition in electrical energy from antenna 30 as determined by comparator 40.

The watchdog timer may be utilized to conserve electrical energy of device 14 during the second mode of operation. If the watchdog timer times out, processor 38 returns to an operational mode having a lower power state wherein less electrical energy is consumed within device 14 (e.g., the sleep mode of operation). For example, processor 38 disables the WAKEUP_EN signal which de-energizes wake-up circuitry 34, disables internal circuitry configured to implement watchdog timer operations, disables ACLK, and/or disables interrupt monitoring of pin 9.

Processor 38 is arranged to monitor for the reception of signals (e.g., received via pin 9) during the second operational mode. For example, wake-up circuitry 34 is arranged to selectively output an indication signal to pin 9 of processor 38 during the second operational mode. In one configuration, wake-up circuitry 34 is configured to compare a frequency of received electromagnetic (e.g., RF) energy as indicated by the signal outputted from comparator 40 with a frequency of the reference signal. Responsive to the comparison, wake-up circuitry 34 selectively asserts the indication signal, also referred to as a wake-up signal or WAKE-UP_VALID signal. In one embodiment, outputting of the indication signal indicates reception of radio frequency energy via antenna 30 which resembles modulated signals outputted from device 12.

In the illustrated exemplary configuration, wake-up circuitry 34 includes an XOR logic device 42, a filter 44, and a transistor 46. In the depicted embodiment, XOR logic device 42 is coupled with comparator 40 and is configured to receive the FM0_IN signal representative of radio frequency energy received via antenna 30. XOR logic device 42 is also coupled with processor 38 and is configured to receive the reference signal.

Filter 44 is coupled intermediate XOR logic device 42 and transistor 46 and is implemented as a low pass filter in the exemplary configuration. Filter 44 is arranged to smooth the output of XOR logic device 42 and selectively trigger transistor 46 responsive to received radio frequency energy via antenna 30 and outputted signals from comparator 40. The output of filter 44 is the frequency difference of the two source signals inputted to device 42 (i.e., beat frequency). If the frequency difference is above a cut-off frequency of filter 44, the output signal has a voltage equal to approximately the mid-point voltage between the supply and ground in the described exemplary configuration. However, the output begins to oscillate at the beat frequency between the ground and supply values if the frequency difference is below the cut-off frequency. The exemplary wake-up circuitry 34 utilizes the filtered signal approaching ground to provide processor 38 in the third operational mode to sample the waveform outputted from comparator 40 and which corresponds to received radio frequency energy via antenna 30. Transistor 46 is ON until the filtered output signal is within 600 mV of ground. When the filtered output signal is below 600 mV, transistor 46 is turned OFF causing an indication signal (i.e., WAKEUP_VALID) to go high which is monitored by processor 38 via pin 9.

As described above in accordance with an exemplary implementation, wake-up circuitry 34 is arranged to compare a frequency of received electrical energy (FMO_IN) with respect to a frequency of the reference signal to analyze radio frequency energy received via antenna 30. The output of filter 44 is above a threshold of transistor 46 if the frequency of the reference signal and the frequency of the signal outputted from comparator 40 are sufficiently different and accordingly, transistor 46 is ON. If the frequency of the output of comparator 40 is substantially equal to a frequency of the reference signal outputted from processor 38, the voltage of filter 44 applied to transistor 46 begins to fall. If such voltage falls below a threshold, such as 0.6 Volts, transistor 46 is provided in an OFF state indicating the reception of an appropriate modulated signal via antenna 30 and corresponding to communications from interrogator 12. Accordingly, wake-up circuitry 34 including XOR logic device 42 and filter 44 operate to compare a frequency of received radio frequency energy with respect to a frequency of the reference signal outputted from processor 38.

In the described exemplary configuration, transistor 46 is arranged to provide device 14 and processor 38 in the third mode of operation having an increased consumption rate of electrical energy responsive to the output of filter 44. During operations in the third operational mode, received signals 18 may be sampled and processed within device 14 and signals 20 may be generated using processor 38. Accordingly, following the assertion of the WAKEUP_VALID signal via transistor 46, communication circuitry 32 is arranged to enter a predefined (e.g., third) mode of operation wherein additional electrical energy is consumed to process first wireless signals 18 received via antenna 30.

According to the illustrated exemplary embodiment, circuitry of device 14 is arranged to analyze received radio frequency energy with respect to a reference signal. Device 14 is arranged to change a mode of operation responsive to the analysis of received radio frequency energy and the reference signal. The analysis of the received radio frequency energy and the reference signal comprises using circuitry external of processor 38 in at least one embodiment. As described herein, processor 38 is arranged to provide operational electrical energy to such external circuitry responsive to the detection of a sufficient radio frequency energy transition received via antenna 30. Such operates to minimize the consumption of electrical energy in the absence of appropriate wireless signals 18.

A watchdog timer may also be enabled during the third operational mode and responsive to the reception of the indication signal. The processor 38 returns operations to a lower power state if communications are not received within processor 38 via pin 10 and/or communications cease for a specified period of time as determined by the watchdog timer.

In the exemplary configuration of FIG. 3, radio frequency energy including communications are received and/or processed using a single receiver of device 14 although other embodiments are possible. The implementation of a single receiver reduces the number of components utilized to implement wake-up functions as well as communications.

Thus, a device has been provided with allows a much smaller and less expensive tag to perform simple sensor monitoring with the ability to communicate asynchronously to the interrogator. This works best for applications where the asynchronous messages are rare, but important and time critical and standard communications messaging is still required.

A possible application is for use with pallet tracking tags, with ability to call for help if tampering occurs. Another possible application is for animal tracking, such as dairy cattle tracking tags; e.g., the device is outside of milking barn's signal for too long. Another possible application is for tracking high value items. Yet another possible application is for security of containers, locking devices, etc. Various other applications are possible.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A radio frequency beacon device for use with a backscatter interrogator, comprising:
   a processor;
   a receiver coupled to the processor;
   a backscatter modulator coupled to the processor; and
   an active transmitter coupled to the processor, the active transmitter being configured to transmit an RF signal, in response to a trigger signal, regardless of whether the interrogator is providing a carrier wave for backscatter modulation by the backscatter modulator.

2. A radio frequency beacon device in accordance with claim 1 and further comprising a common antenna coupled to the backscatter modulator and to the active transmitter.

3. A radio frequency beacon device in accordance with claim 1 and further comprising a first antenna coupled to the active transmitter and a second antenna coupled to the receiver.

4. A radio frequency beacon device in accordance with claim 1 and further comprising a power source coupled to the processor, backscatter modulator, receiver and active transmitter, and wherein power is supplied temporarily to the transmitter, from the power source, in response to the trigger signal.

5. A radio frequency beacon device in accordance with claim 1 and further comprising a battery coupled to the processor, backscatter modulator, receiver and active transmitter, and wherein power is supplied temporarily to the transmitter, from the battery, in response to the trigger signal.

6. A radio frequency beacon device in accordance with claim 1 and configured to provide an attention signal to the interrogator and have the interrogator thereafter contact the beacon device in response to receiving the attention signal.

7. The radio frequency beacon device of claim 1 wherein the trigger signal is not communicated by the interrogator.

8. The radio frequency beacon device of claim 1 wherein the trigger signal originates using the beacon device.

9. The radio frequency beacon device of claim 6 wherein the beacon device is configured to transmit the attention signal when the beacon device is not concurrently receiving a carrier wave from the interrogator.

10. The radio frequency beacon device of claim 6 wherein the attention signal is a wireless signal transmitted by the active transmitter of the beacon device.

11. A radio frequency communications system comprising:
    a backscatter interrogator; and
    a beacon device comprising:
      a processor;
      a receiver coupled to the processor;
      a backscatter modulator coupled to the processor;
      an active transmitter coupled to the processor, the active transmitter being configured to transmit an RF signal to the interrogator, in response to a trigger signal, regardless of whether the interrogator is providing a carrier wave for backscatter modulation by the backscatter modulator; and
      a sensor coupled to the processor, the trigger signal being generated in response to a condition sensed by the sensor;
    wherein the interrogator is configured to contact the beacon device in response to receiving the RF signal transmitted by the active transmitter.

12. A system in accordance with claim 11 wherein the sensor is a make-break sensor.

13. A system in accordance with claim 11 wherein the sensor is a tamper detection sensor.

14. A system in accordance with claim 11 wherein the sensor is a temperature sensor.

15. A system in accordance with claim 11 wherein the sensor is a moisture sensor.

16. A system in accordance with claim 11 wherein the sensor is a shock sensor.

17. The system of claim 11 wherein the backscatter interrogator comprises:
a transmitter configured to transmit the carrier wave to the beacon device;
a first receiver configured to receive backscatter transmissions from the backscatter modulator of the beacon device, the backscatter transmissions comprising a backscattered version of the carrier wave;
a second receiver configured to receive the RF signal transmitted by the active transmitter of the beacon device; and
wherein the backscatter interrogator is configured to transmit a message to the beacon device via the transmitter in response to receiving the RF signal from the beacon device via the second receiver.

18. The system of claim 17 wherein the message indicates that the beacon device is to respond to the message by transmitting a response message via the active transmitter.

19. The system of claim 17 wherein the message indicates that the beacon device is to respond to the message by transmitting a response message via the backscatter modulator and the active transmitter.

20. The system of claim 11 wherein the trigger signal is not communicated by the interrogator and the beacon device is configured to transmit the RE signal when the beacon device is not concurrently receiving a carrier wave from the interrogator.

21. The system of claim 11 wherein the sensor is configured to sense a condition with respect to the beacon device and to generate the trigger signal responsive to the sensing.

22. A radio frequency communications device, for use with a backscatter interrogator, comprising:
a battery;
a semi-passive radio frequency device, coupled to the battery, for use with a backscatter interrogator, including components configured to be supplied with power from the battery, wherein range is greater than for a passive backscatter radio frequency device, the semi-passive radio frequency device including:
a processor;
a receiver coupled to the processor; and
a backscatter modulator coupled to the processor; and
an active transmitter coupled to the processor and to the battery, the active transmitter being configured to transmit, in response to a trigger signal, regardless of whether the interrogator is providing a carrier wave for backscatter modulation by the backscatter modulator.

23. A radio frequency communications device in accordance with claim 22 and further comprising a common antenna selectively used by the backscatter modulator and the active transmitter.

24. A radio frequency communications device in accordance with claim 22 and further comprising a first antenna coupled to the active transmitter and a second antenna coupled to the receiver.

25. A radio frequency communications device in accordance with claim 22 wherein power is supplied temporarily to the transmitter, from the battery, in response to the trigger signal.

26. A radio frequency communications device in accordance with claim 22, wherein the active transmitter is configured to merely provide an attention signal to the interrogator whereby the interrogator thereafter contacts the device via backscatter communications.

27. The radio frequency communications device of claim 22 wherein the trigger signal is not communicated by the interrogator.

28. The radio frequency communications device of claim 22 wherein the trigger signal originates using the beacon device.

29. A radio frequency communications device, for use with a backscatter interrogator, comprising:
a battery;
a semi-passive radio frequency device, coupled to the battery, for use with a backscatter interrogator, including components configured to be supplied with power from the battery, wherein range is greater than for a passive backscatter radio frequency device, the semi-passive radio frequency device including:
a processor;
a receiver coupled to the processor; and
a backscatter modulator coupled to the processor; and
an active transmitter coupled to the processor and to the battery, the active transmitter being configured to transmit, in response to a trigger signal, regardless of whether the interrogator is providing a carrier wave for backscatter modulation by the backscatter modulator; and
a sensor coupled to the processor, the sensor being configured to sense a condition with respect to the radio frequency communication device and to generate the trigger signal responsive to the sensing and independent of communications of the interrogator.

30. A radio frequency communications device in accordance with claim 29 wherein the sensor is a make-break sensor.

31. A radio frequency communications device in accordance with claim 29 wherein the sensor is a tamper detection sensor.

32. A radio frequency communications device in accordance with claim 29 wherein the sensor is a temperature sensor.

33. A radio frequency communications device in accordance with claim 29 wherein the sensor is a moisture sensor.

34. A radio frequency communications device in accordance with claim 29 wherein the sensor is a shock sensor.

35. A radio frequency communications device in accordance with claim 29 wherein the sensor is a temperature threshold sensor.

36. A radio frequency communications device in accordance with claim 29 wherein the sensor is a vibration sensor.

37. A radio frequency communications device in accordance with claim 29 wherein the sensor is an acceleration sensor.

38. A radio frequency communications device in accordance with claim 29 wherein the sensor is a humidity sensor.

39. A radio frequency communications device in accordance with claim 29 wherein the sensor is a tilt sensor.

40. A radio frequency communications device in accordance with claim 29 wherein the sensor is an electric field sensor.

41. A radio frequency communications device in accordance with claim 29 wherein the sensor is a magnetic field sensor.

42. A radio frequency communications device in accordance with claim 29 wherein the sensor is a gas concentration sensor.

43. A radio frequency communications device in accordance with claim 29 wherein the sensor is a proximity sensor.

44. A radio frequency communications device in accordance with claim 29 wherein the sensor is an illumination sensor.

45. A radio frequency communications device in accordance with claim 29 wherein the sensor is a fluid level sensor.

46. A radio frequency communications device in accordance with claim 29 wherein the sensor is an immersion sensor.

47. A method of manufacturing a radio frequency beacon device for use with a backscatter interrogator, the method comprising:
coupling a receiver to a processor, coupling a backscatter modulator coupled to the processor, and coupling an active transmitter to the processor; and
arranging the active transmitter to transmit an RF signal, in response to a trigger signal, regardless of whether the interrogator is providing a carrier wave for backscatter modulation by the backscatter modulator.

48. A method of manufacturing a radio frequency beacon device in accordance with claim 47 and further comprising coupling a common antenna to the backscatter modulator and to the active transmitter.

49. A method of manufacturing a radio frequency beacon device in accordance with claim 47 and further comprising coupling a first antenna to the active transmitter and coupling a second antenna to the receiver.

50. A method of manufacturing a radio frequency beacon device in accordance with claim 47 and further comprising coupling a power source to the processor, backscatter modulator, receiver and active transmitter, and supplying power temporarily to the transmitter, from the power source, in response to the trigger signal.

51. A method of manufacturing a radio frequency beacon device in accordance with claim 47 and further comprising coupling a battery to the processor, backscatter modulator, receiver and active transmitter, and supplying power temporarily to the transmitter, from the battery, in response to the trigger signal.

52. A method of manufacturing a radio frequency beacon device in accordance with claim 47, wherein the beacon device provides an attention signal to the interrogator and in response to receiving the attention signal, the interrogator thereafter contacts the device via backscatter communications.

53. The method of claim 52 wherein the beacon device provides the attention signal during a period of time when the beacon device is not concurrently receiving a carrier wave from the interrogator.

54. The method of claim 47 wherein the trigger signal is not communicated by the interrogator.

55. The method of claim 47 wherein the trigger signal originates using the beacon device.

56. A method of manufacturing a radio frequency beacon device for use with a backscatter interrogator, the method comprising:
coupling a receiver to a processor, coupling a backscatter modulator to the processor, and coupling an active transmitter to the processor;
arranging the active transmitter to transmit an RF signal, in response to a trigger signal, regardless of whether the interrogator is providing a carrier wave for backscatter modulation by the backscatter modulator; and
coupling a sensor to the processor, the trigger signal being generated in response to a condition sensed by the sensor.

57. A method of manufacturing radio frequency beacon device in accordance with claim 56 wherein the sensor is a sensor selected from the group consisting of a make-break sensor, a tamper detection sensor, a temperature sensor, a moisture sensor, a shock sensor, a temperature threshold sensor, a shock sensor, a vibration sensor, an acceleration sensor, a humidity sensor, a tilt sensor, an electric field sensor, a magnetic field sensor, a gas concentration sensor, a proximity sensor, an illumination sensor, a fluid level sensor, and an immersion sensor.

58. The method of claim 56 wherein the trigger signal is not communicated by the interrogator.

59. The method of claim 56 wherein the trigger signal originates using the beacon device.

60. The method of claim 56 wherein the sensor is configured to sense a condition with respect to the beacon device and to generate the trigger signal responsive to the sensing.

61. The method of claim 56 wherein the active transmitter transmits the RE signal during a period of time when the beacon device is not concurrently receiving a carrier wave from the interrogator.

62. A method of manufacturing a radio frequency communications device, for use with a backscatter interrogator, the method comprising:
providing a battery;
coupling a semi-passive radio frequency device to the battery, the device being for use with a backscatter interrogator and including components configured to be supplied with power from the battery, wherein range is greater than for a passive backscatter radio frequency device, the semi-passive radio frequency device including:
a processor;
a receiver coupled to the processor; and
a backscatter modulator coupled to the processor; and
coupling an active transmitter to the processor of the semi-passive tag and to the battery, and configuring the active transmitter to transmit, in response to a trigger signal, regardless of whether the interrogator is providing a carrier wave for backscatter modulation by the backscatter modulator.

63. A method of manufacturing a radio frequency communications device in accordance with claim 62 and further comprising the backscatter modulator and the active transmitter selectively using a common antenna.

64. A method of manufacturing a radio frequency communications device in accordance with claim 62 and further comprising coupling a first antenna to the active transmitter and coupling a second antenna coupled to the receiver.

65. A method of manufacturing a radio frequency communications device in accordance with claim 62 and comprising supplying power temporarily to the transmitter, from the battery, in response to the trigger signal.

66. A method of manufacturing a radio frequency communications device in accordance with claim 62 and comprising configuring the active transmitter to provide an attention signal to the interrogator and planning on the interrogator to contact the device via backscatter communications in response to receiving the attention signal for communications relating to the attention signal.

67. The method of claim 66 wherein the radio frequency communications device is configured to transmit the attention signal during a period of time when the radio frequency communications device is not concurrently receiving a carrier wave from the interrogator.

68. The method of claim 62 wherein the trigger signal is not communicated by the interrogator.

69. The method of claim 62 wherein the trigger signal originates using the beacon device.

70. A method of manufacturing a radio frequency communications device, for use with a backscatter interrogator, the method comprising:

providing a battery;

coupling a semi-passive radio frequency device to the battery, the device being for use with a backscatter interrogator and including components configured to be supplied with power from the battery, wherein range is greater than for a passive backscatter radio frequency device, the semi-passive radio frequency device including:

a processor;

a receiver coupled to the processor; and a backscatter modulator coupled to the processor; and coupling an active transmitter to the processor of the semi-passive tag and to the battery, and configuring the active transmitter to transmit, in response to a trigger signal, regardless of whether the interrogator is providing a carrier wave for backscatter modulation by the backscatter modulator, the trigger signal being independent of the interrogator; and coupling a sensor to the processor of the semi-passive tag, the sensor being configured to sense a condition with respect to the semi-passive tag and to generate the trigger signal responsive to the sensing.

71. A method of manufacturing a radio frequency communications device in accordance with claim 70 wherein the sensor is a sensor selected from the group consisting of a make-break sensor, a tamper detection sensor, a temperature sensor, a moisture sensor, a shock sensor, a temperature threshold sensor, a shock sensor, a vibration sensor, an acceleration sensor, a humidity sensor, a tilt sensor, an electric field sensor, a magnetic field sensor, a gas concentration sensor, a proximity sensor, an illumination sensor, a fluid level sensor, and an immersion sensor.

72. The method of claim 70 wherein the trigger signal originates using the beacon device.

* * * * *

UNITED STATES PATENT AND TRADEMARK OFFICE
CERTIFICATE OF CORRECTION

PATENT NO.         : 7,348,875 B2                                    Page 1 of 1
APPLICATION NO. : 10/839058
DATED              : March 25, 2008
INVENTOR(S)        : Michael A. Hughes and Richard M. Pratt It is certified that error appears in the above-identified patent and that said Letters Patent is hereby corrected as shown below:

Column 7, line 18
Please replace "FM0_IN"
With -- FMO_IN --

Column 7, line 24
Please replace "FM0_IN"
With -- FMO_IN --

Column 8, line 18
Please replace "FM0_IN"
With -- FMO_IN --

Column 11, claim 20, line 27
Please replace "RE signal"
With -- RF signal --

Column 14, claim 61, line 20
Please replace "RE signal"
With -- RF signal --

Signed and Sealed this

Twenty-first Day of October, 2008

JON W. DUDAS
*Director of the United States Patent and Trademark Office*